United States Patent
Friske et al.

(10) Patent No.: US 6,535,870 B1
(45) Date of Patent: Mar. 18, 2003

(54) METHOD OF ESTIMATING AN AMOUNT OF CHANGED DATA OVER PLURALITY OF INTERVALS OF TIME MEASUREMENTS

(75) Inventors: Craig Alan Friske, San Jose, CA (US); John Marland Garth, Gilroy, CA (US); James Alan Ruddy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,486

(22) Filed: Feb. 9, 2000

(51) Int. Cl.[7] .............................................. G06F 17/30
(52) U.S. Cl. ................... 707/2; 707/3; 707/6; 707/100; 707/103
(58) Field of Search .............................. 707/1–7, 9–10, 707/100–104.1, 200–205; 709/220–224, 247–248, 123, 108, 181–182; 700/109

(56) References Cited

U.S. PATENT DOCUMENTS

| | | | | |
|---|---|---|---|---|
| 5,119,493 A | | 6/1992 | Janis et al. .................. 709/101 |
| 5,270,957 A | * | 12/1993 | Murray ........................ 702/83 |
| 5,404,509 A | * | 4/1995 | Klein .......................... 707/101 |
| 5,542,089 A | | 7/1996 | Lindsay et al. ................ 707/2 |
| 5,668,991 A | | 9/1997 | Dunn et al. .................. 707/202 |
| 5,675,786 A | * | 10/1997 | McKee et al. ................ 705/33 |
| 5,689,696 A | * | 11/1997 | Gibbons et al. ............. 382/212 |
| 5,701,471 A | | 12/1997 | Subramanyam ............. 707/200 |
| 5,717,607 A | * | 2/1998 | Hu .............................. 700/109 |
| 5,758,150 A | | 5/1998 | Bell et al. .................... 707/10 |
| 5,819,066 A | | 10/1998 | Bromberg et al. .......... 707/102 |
| 5,867,483 A | * | 2/1999 | Ennis et al. ................ 370/252 |
| 5,870,752 A | * | 2/1999 | Gibbons et al. ............. 707/101 |
| 5,878,426 A | * | 3/1999 | Plasek et al. ............... 707/102 |
| 5,890,150 A | * | 3/1999 | Ushijima et al. .............. 707/3 |
| 5,890,164 A | | 3/1999 | Nielsen ...................... 707/201 |
| 5,950,185 A | * | 9/1999 | Alon et al. .................... 707/1 |
| 5,999,928 A | * | 12/1999 | Yan .............................. 707/6 |
| 6,035,295 A | * | 3/2000 | Klein .......................... 707/10 |
| 6,191,799 B1 | * | 2/2001 | Purdy ......................... 345/473 |
| 6,278,694 B1 | * | 8/2001 | Wolf et al. .................. 370/253 |
| 6,278,989 B1 | * | 8/2001 | Chaudhuri et al. .......... 706/19 |
| 6,282,570 B1 | * | 8/2001 | Leung et al. ............... 707/200 |
| 6,366,901 B1 | * | 4/2002 | Ellis ............................. 707/2 |

FOREIGN PATENT DOCUMENTS

| | | |
|---|---|---|
| JP | 8-235034 | 9/1996 |
| WO | WO 99/04337 | * 1/1999 |

OTHER PUBLICATIONS

Peter J Haas et al., sampling based estimation of the Number of distinct values of an attribute, 21st VLDB conference 1995, p. 311–322.*

WO 9904337 A, Robinson, GA, Measurement method for assessing maintainability of software (Abstract).

WO 9809236 A, Lehtinen, P, Monitoring load situation in service database system (Abstract).

WO 9809235 A, Lehtinen P, Performing event recordings in service database system in intelligent network (Abstract).

WO 9809233 A, Lehtinen P, Method for performing event recordings in service database system, (Abstract).

WO 9809232 A, Lehtinen, P, Method for performing event recordings in service database sytem, (Abstract).

WO 9809231 A, Lehtinen, P, Performing event recordings in service database of intelligent network, (Abstract).

(List continued on next page.)

Primary Examiner—Srirama Channavajjala

(57) ABSTRACT

A technique for identifying changes in a data store connected to a computer. Initially, one or more interval changes are measured. Each interval change indicates an amount of change in the data store at an interval. Next, a data store change is estimated that indicates an amount of change in the data store across all of the intervals using each interval change.

21 Claims, 3 Drawing Sheets

OTHER PUBLICATIONS

WO 9809230 A, Lehtinen, P, Performing event recording in service database of intelligent network database, (Abstract).

INSPEC Abstract C9901–7430–002, Magnusson, PS et al, Proceedings of USENIX 1998 Annual Technical Conf., SimlCS/sun4m: a virtual workstation, Jun. 1998, p. 119–130 (Abstract Only).

INSPEC Abstract C9512–6160–016, Revell, N et al, Proceedings of 12$^{th}$ European Meeting on Cybernetics and Systems Research, Testing and verification of the CITY database benchmark, Apr. 1994, p. 1337–44 (Abstract Only).

INSPEC Abstract C9502–7480–038, Goh, A. et al, Proceedings of TENCON '94—1994 IEEE Region 10's 9$^{th}$ Annual Int'l. Conf. On: Frontiers of Computer Technology, Benchmarking CAD/CAM database systems using Part 42 of STEP, Aug. 1994 (Only Abstract).

INSPECT Abstract C9303–6115–043, Freeman, RJ, Proceedings Fifth Int'l Workshop on Computer–Aided Software Engineering , An Empirical Study of the linkage of CASE, function points, and systems development, p. 254–7, Jul. 1992 (Only Abstract).

INSPECT Abstract C88030635, Rubenstein, WB, et al, SIGMOD Record, vol. 16, No. 3, Benchmarking simple database operations, p. 387–394 (Only Abstract).

INSPECT Abstract C87061069, Lee, TP, et al, Proceedings of the Summer 1987 USENIX Conference, Solving performance problems on a multiprocessor UNIX system, p. 399–405 (Only Abstract).

\* cited by examiner

METHOD OF ESTIMATING AN AMOUNT OF CHANGED DATA OVER PLURALITY OF INTERVALS OF TIME MEASUREMENTS

BACKGROUND OF THE INVENTION

1. Field of the Invention

This invention relates in general to computer-implemented database systems, and, in particular, to estimating an amount of change in a data store.

2. Description of Related Art

Databases are computerized information storage and retrieval systems. A Relational Database Management System (RDBMS) is a database management system (DBMS) that uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Some systems have very large databases, storing data on the order of terrabytes of information. With the growing use of computers and the increased types of data that is stored on a storage device (e.g., images and audio, as well as large amounts of text), such large databases are becoming more and more common.

As data in a database changes over time, from updates, deletes, and inserts of new data, it is usually necessary to perform maintenance operations on the database (e.g., to reclaim space, restore optimal clustering, make a full copy of the data, or collect statistics about the data that can be used to optimize access paths). Since these operations are time consuming, it is useful to perform them only when the amount of change has exceeded some threshold value.

Some conventional programs run the maintenance operations at particular intervals, without regard to the amount of change in the database. For example, certain maintenance operations are run once every 24 hours or once each 30 days. This conventional technique may unnecessarily perform maintenance operations on a database that has had little or no change.

Some conventional programs estimate change in a database by counting all record insertions and deletions and compare the total count to a threshold value to determine whether to perform maintenance operations. This conventional technique is inefficient, especially in large databases.

Thus, there is a need in the art for an improved technique for determining an amount of change in a database.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented technique for estimating an amount of change in a data store.

In accordance with the present invention, changes are identified in a data store connected to a computer. Initially, one or more interval changes are measured. Each interval change indicates an amount of change in the data store at an interval. Next, a data store change is estimated that indicates an amount of change in the data store across all of the intervals using each interval change.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
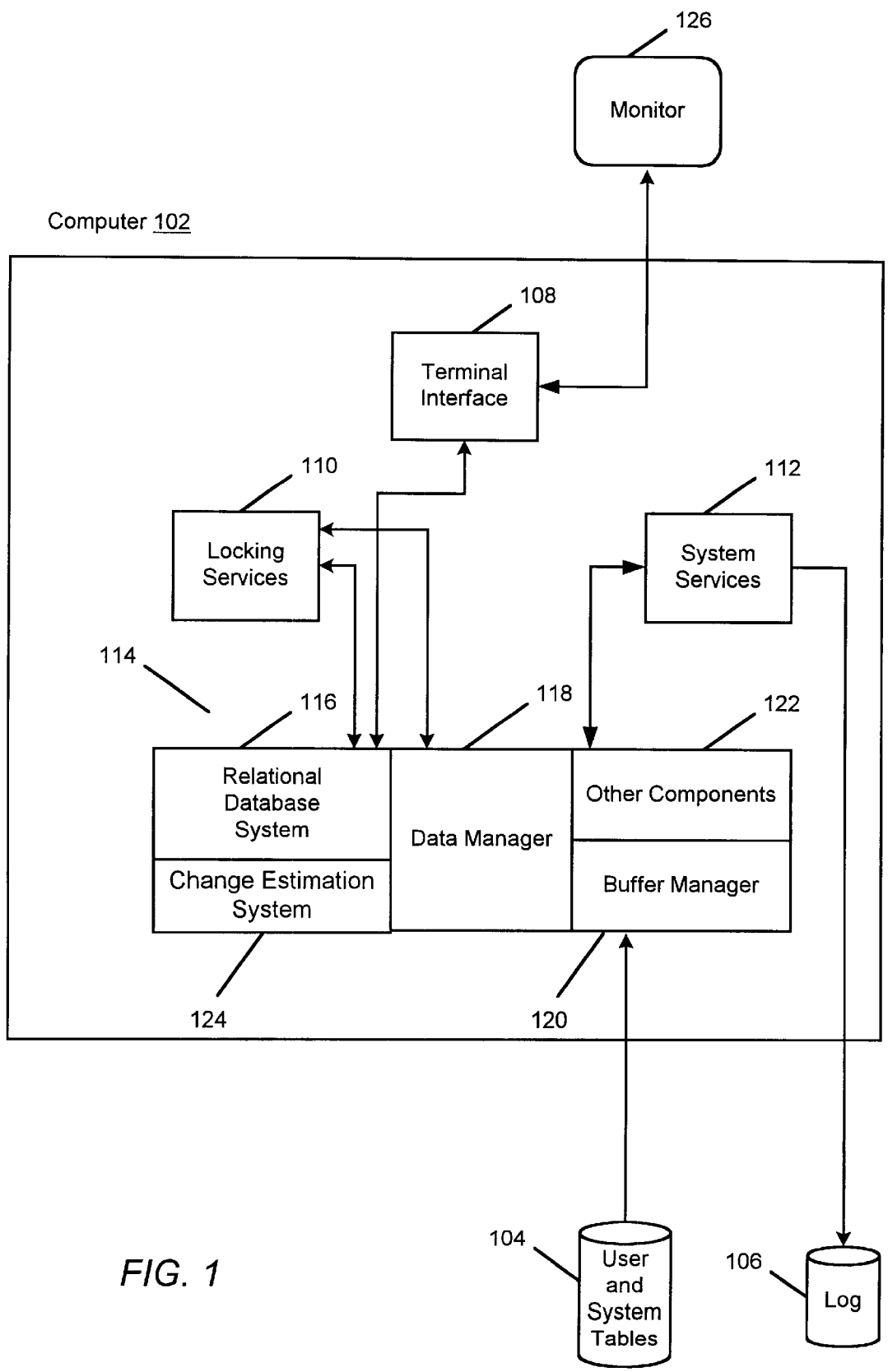
FIG. 1 is a diagram illustrating a computer hardware environment that could be used in accordance with the present invention.

FIG. 1 is a diagram illustrating a computer hardware environment that could be used in accordance with the present invention. In the environment, a computer system 102 is comprised of one or more processors connected to one or more data stores 104 and 106 that store one or more relational databases in tablespaces. The data stores 104 and 106 may comprise a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In an embodiment of the present invention, the RDBMS software comprises the DB2® product offered by IBM for the OS/390® operating systems. Those skilled in the art will recognize, however, that the present invention has application to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, and other components 122 such as an SQL compiler/interpreter. Additionally, a change estimation system 124 works in conjunction with the other modules to estimate a number of changes in the database. These submodules support the functions of the SQL language, i.e. definition, access control, interpretation, compilation, database retrieval, and update of user and system data.

The present invention is generally implemented in a programming language such as C or COBOL, which comprises the Change Estimation System 124. The Change Estimation System 124 is an SQL application, that is, SQL statements are embedded in the programming language statements of the Change Estimation System 124, which submits the SQL statements for execution under the control of the Database Services module 114. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data stores 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data stores 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention.

A Technique for Estimating Percent Change Over Time in a Database from a Series of Individual Measurements An embodiment of the invention provides a change estimation system 124. The change estimation system 124 estimates a cumulative amount of change from a series of individual measurements. Each of the measurements measures an amount of change, typically using a percentage, since the previous measurement. However, one measurement may include changes included in a previous measurement. The change estimation system 124 estimates an amount of change by taking into account that some of the changes overlap across the different measurements taken at intervals. The change estimation system 124 further takes into account additions to data or changes to the same data across intervals.

A simple technique would be to add the percentages from the individual measurements. However, while it is possible that the set of changed records in each measurement never overlaps the set of changed records from any other measurement, it is more likely that the set of changed records from one measurement overlaps the set of changed records from the next measurement. Thus, adding the percentages, with each percentage including an overlapping amount of changes, results in an inaccurate amount of change. For example, at interval 1, the simple technique may determine that 50% of the records in the database were changed. Then, at interval 2, if additional changes were made to the same data since the measurement taken at interval 1, the simple technique would determine that 50% of the records in the database were changed (i.e., these were already changed in interval 1). Simply adding these percentages would result in an indication that 100% of the records had changed across the two intervals, when only 50% of the records had changed across both intervals.

Figure 2:
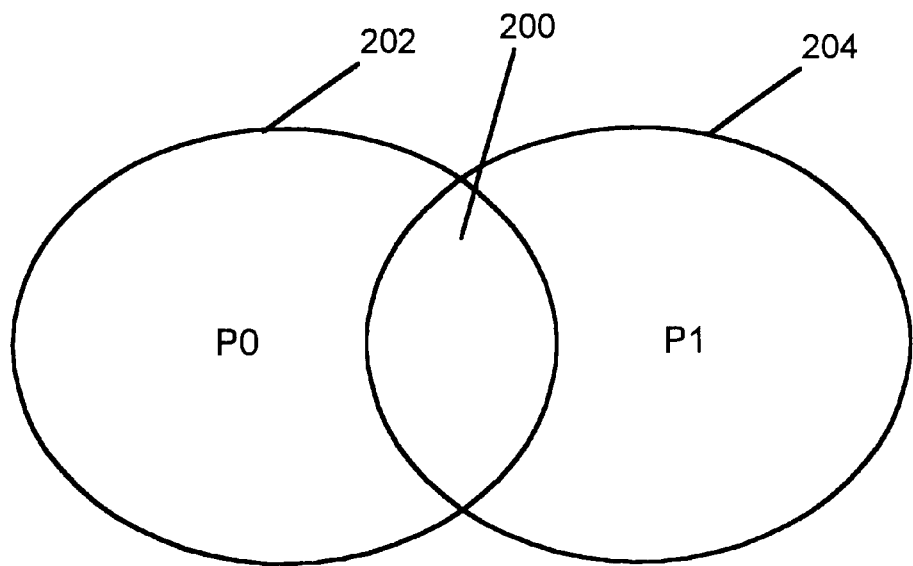
FIG. 2 is a block diagram illustrating a Venn diagram.

FIG. 2 is a block diagram illustrating a Venn diagram. In the Venn diagram, sets of data and their relationships are represented. In particular, at time $T_0$, measurement $P_0$ is taken. $P_0$ 202 is a percentage of data changed at time $T_0$. At time $T_1$, measurement $P_1$ 204 is taken and represents a percentage of data changed at time $T_1$. Some data that was identified as changed at time $T_0$ is also identified as changed at time $T_1$. Additionally, at time $T_1$, other changed data may be identified. The overlap 200 represents the amount of data that was identified as changed at time $T_0$ and was identified again as changed at time $T_1$.

The changes to the database include, for example, updates to records, insertion of records, and deletion of records. The intervals of time may be random or fixed intervals, and may be in any time measurement, such as seconds or days. At a given interval, the amount of change may be determined using various mechanisms, such as running a COPY program that identifies an amount of change in a database.

In one embodiment, it is assumed that the updates to the data store are entirely random (i.e., every page has an equal probability of being updated). In this case, at time $T_0$, the change estimation system 124 determines that the percent of changed records is $P_0$. At time $T_1$, the change estimation system 124 determines that the percent of records changed is $P_1$. Next, the change estimation system estimates that the number of records changed across times $P_0$ and $P_1$ is equivalent to the sum of the percent of records changed at each interval (i.e., $P_0+P_1$) minus the product of the percent of records changed at each interval (i.e., $P_0*P_1$). Thus, the following is an estimate for the total number of records updated across two intervals:

$$\text{Estimate} = P_0 + P_1 - P_0 * P_1$$

Note that in the above example, the variables referred to records (e.g., $P_0$ was a percentage of records). It is to be understood that each of the variables may refer to other entities, such as pages (e.g., $P_0$ may be a percentage of pages). Additionally, it is to be understood that the change estimation system 124 may be used with one interval measurement, in which case one of the percentages is zero. For example, $P_0$ may be set to zero, while $P_1$ is set to the measurement taken at the one interval.

For the following example, the first measurement (i.e., at time $T_0$) detects 10% (i.e., $P_0$) of the records changed, and the second measurement (i.e., at time $T_1$) detects 20% (i.e., $P_1$) of the records changed. Thus, the change estimation system 124 estimates that the total percent of records changed across the two intervals is:

$$0.10+0.20-0.10*0.20=0.28=28\%$$

If a third measurement detects 50% of the records changed, then the change estimation system 124 estimates that the total percent of records changed across three intervals is:

$$0.28+0.50-0.28*0.50=0.64=64\%$$

If a fourth measurement copy detects 10% changed, then the change estimation system 124 estimates that the total percent of records changed across four intervals is:

$$0.64+0.10-0.64*0.10=0.676=67.6\%$$

In an alternative embodiment, it is assumed that the updates are not random. In this case, the change estimation system 124 takes into account that if updates tend to occur at the end of the table space (i.e., that the updates are newly added records), it is likely that each set of changed records will not overlap. Thus, the formula, Estimate=$P_0+P_1-P_0*P_1$, may underestimate the percentage of changed records.

To adjust for new records added at the end of the tablespace, the change estimation system 124 tracks the total number of records changed at each time interval. Then, the change estimation system 124 subtracts the increase in page count out of the percent changed, applies the above formula (Estimate=$P_0+P_1-P_0*P_1$), and then adds the new page count back in. In particular, at time $T_0$, the percent of changed records is $P_0$, and at time $T_1$, the percent of changed records is $P_1$. Also, at time $T_0$, there are $N_0$ total records, and, at time $T_1$, there are $N_1$ total records. The difference in records from time $T_0$ to time $T_1$ is an increase of $N_1-N_0$ records, which will be referred to as $D_1$. At time $T_1$, the number of changed records is $N_1*P_1$, which will be referred to as $C_1$. Removing the new records, the change estimation system 124 calculates that the number of changed records since the previous measurement is the number of changed records at time $T_1$ minus the increased number of records at time $T_1$. (i.e., $C_1-D_1$, which will be referred to as $C_{1'}$). The new percentage changed records is the number of changed records since the previous measurement divided by the total number of records (i.e., $C_{1'}/N_1$, which will be referred to as $P_{1'}$). Based on these calculations, the change estimation system 124 estimates the total number of changed records as:

$$\text{Estimate}=(((P_0+P_{1'}-P_0*P_{1'})*N_0)+D_1)/N_1$$

Note that in the above example, the variables referred to records (e.g., $N_0$ represented a number of records). It is to be understood that each of the variables may refer to other entities, such as pages (e.g., $N_0$ may represent total number of pages). Additionally, it is to be understood that the change estimation system 124 may be used with one interval measurement.

For the following example, the first measurement (i.e., at time $T_0$) detects 10% (i.e., $P_0$) of the records changed, and the second measurement (i.e., at time $T_1$) detects 30% (i.e., $P_1$) of the records changed. Also, at time $T_0$, there are 50 records, and at time $T_1$, there are 60 records. Thus, the change estimation system 124 calculates the following:

$D_1$ is 10 records (i.e., $N_1-N_0$ or 60-50)

$C_1$ is 18 records (i.e., $N_1*P_1$ or 60*30%)

$C_{1'}$ is 8 records (i.e., $C_1-D_1$ or 18-8)

$P_{1'}$ is 13% (i.e., $C_{1'}/N_1$ or 8/60)

Next, the change estimation system 124 estimates that the total percent of records changed across the two intervals is:

$$(((0.10+0.13-0.10*0.13)*50)+10)/60)=0.35=35\%$$

In yet another embodiment, the change estimation system 124 determines that the updates tend to occur so that the same records tend to get updated over and over again (i.e., that the updates tend to occur in "hot spots"). In this case, the original formula, Estimate=$P_0+P_1-P_0*P_1$, may overestimate the percentage of changed records.

If updates to the data base tend to occur to the same records over and over again (i.e., there are "hot spots" that have much more update activity than the rest of the data base), the change estimation system 124 identifies the hot spots in the data and takes these into account when determining an estimate of changes in the database.

The hot spot activity cannot be accounted for by a record counting technique. Therefore, the change estimation system 124 is possible to account for hot spot activity by distinguishing between pages that have been updated more than once and those that have been updated only once. For the estimate that takes into account hot spots, $N_c$ is the total number of changed records. $N_0$ is the number of records added or updated at time $T_0$. $N_1$ is the number of records added or updated at time $T_1$ only. $N_b$ is the number of records added or updated at both time $T_0$ and time $T_1$. $N_t$ is the total number of records in the data base. With these factors, the change estimation system 124 calculates the following:

$$\text{Estimate} = N_c = \frac{N_0 + N_1 + N_b}{N_t}$$

One technique for distinguishing between records that are updated only once and those that are updated more than once is to keep track of which records were updated at the time of each measurement. This can be done, for example, by keeping track of the record numbers of the updated records, or by using a bit map to indicate which records were updated. With one measurement taken at time $T_0$ and another at time $T_1$, the record numbers from each measurement can be compared (or the bit maps compared) to determine which records were updated at time $T_0$, which were updated at time $T_1$, and which were updated at both times. These counts can then be used in the above formula to determine the total number of changed records. The two lists of record numbers, or the two bit maps, can then be merged so that the combined information could be used again in a similar comparison at a later time $T_2$.

In some cases, identifying hot spots in the data may be expensive. In this case, the change estimation system 124 can disregard the overestimation because the above formulas provide better estimates than adding up the percent of records changed over time.

Based on the estimated changes to the database, the cost estimation system 124 identifies one or more maintenance operations to be performed. The maintenance operations may be performed by executing utility programs. For example, a RUNSTATS program may be executed to collect statistics on data, a REORG program may be executed to reorganize the database, a COPY program may be executed for backing up the database, or a RECLAIM program may be executed for reclaiming space in the database.

Figure 3:
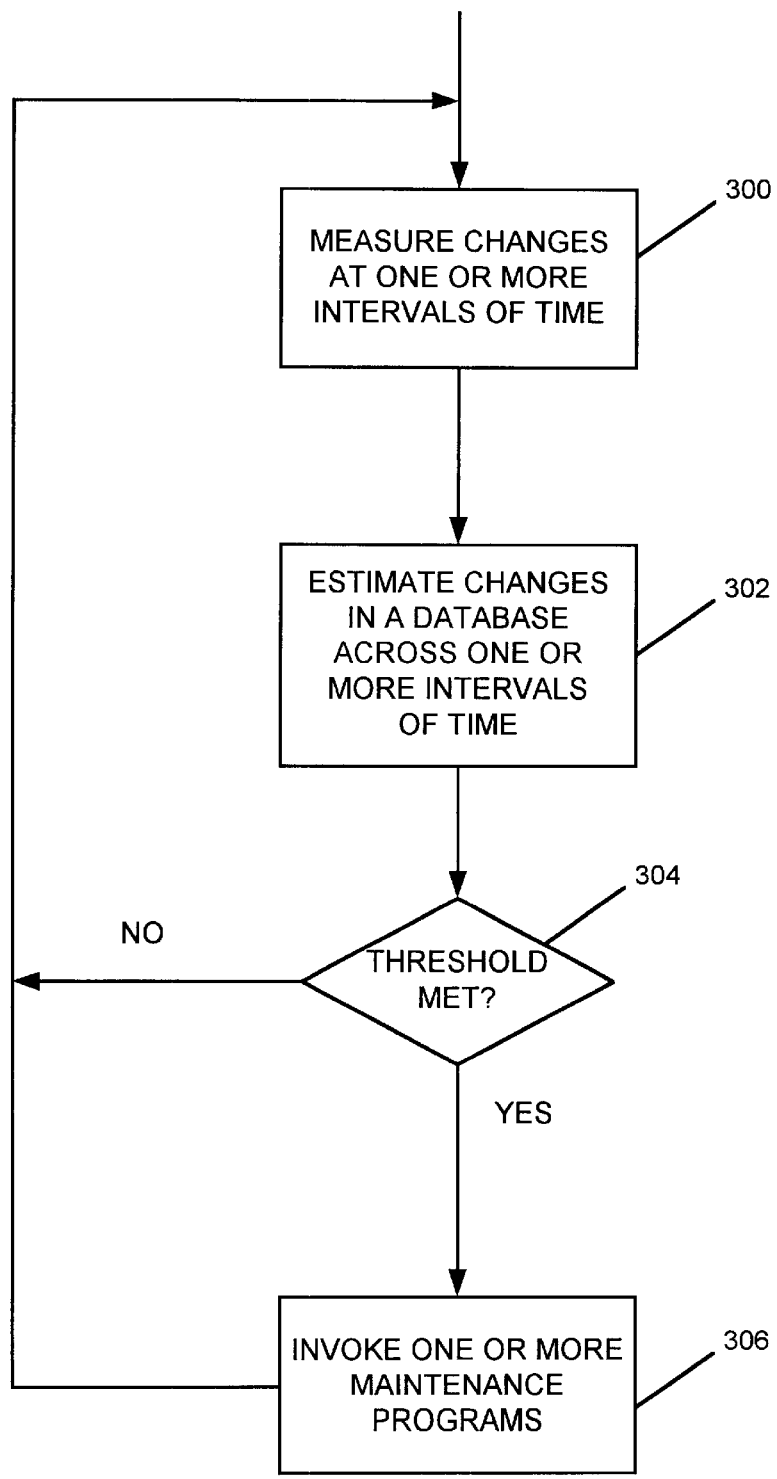
FIG. 3 is a flow diagram illustrating steps performed by the change estimation system to estimate changed records in a data store.

FIG. 3 is a flow diagram illustrating steps performed by the change estimation system 124 to estimate changed records in a data store. In block 300, the change estimation system 124 measures changes at one or more intervals of time ("interval changes"). The intervals may be random intervals or may be fixed intervals. Additionally, the changes to the database include various changes, such as updates to records, insertion of records, and deletion of records. The measurements are typically taken while other tasks (e.g., the database is being accessed) are being performed.

In block 302, the change estimation system 124 estimates changes in a database across the one or more intervals of time ("data store change"). In particular, the changes estimated may be for any type of entity, such as records or pages of a database stored in a data store. Furthermore, it is to be understood that the invention is applicable to other types of data in other types of data structures. For example, the invention is applicable to a file in a data store, and the changes estimated may be for pages of the file. The estimated changes take into account changes that overlap between intervals, additions to the database, and hotspots.

In block 304, the change estimation system 124 determines whether the estimated amount of change meets a threshold. If so, the change estimation system 124 continues to block 306, otherwise, the change estimation system 300. The threshold may be different for different maintenance operations. Additionally, the threshold may be set by a system administrator or by a user via, for example, a graphical user interface.

In block 306, the change estimation system invokes one or more maintenance programs. It is to be understood that other processing may take place instead of, or in addition to, invoking the maintenance programs. It is also to be understood that, although the flow diagram of FIG. 3 illustrates the technique in a continuous loop, the change estimation system 124 may terminate, for example, after invoking maintenance programs, or based on some other event.

Some conventional applications count all record insertions and deletions. One advantage of the invention is that it is generic and may be used with the conventional applications, without requiring any modification to the conventional applications.

In summary, the change estimation system 124 solves the problem of estimating an overall percentage change to a set of records of data in a database from individual measurements of percentage change at intervals of time.

CONCLUSION

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of estimating an amount of changed data stored within a data store based on changes made over a plurality of intervals of time, the data store having a plurality of data elements stored therein, the method comprising:

measuring, for each of the plurality of intervals of time, a number of data elements that change in the interval;

estimating a number of data elements that changed during more than one of the intervals; and estimating across the plurality of intervals a total number of data elements that changed using the measured number of changed data elements and taking into consideration the estimated number of data elements that changed during more than one of the intervals.

2. The method of claim 1, wherein the total number of data elements that changed is estimated by summing a percentage of elements changed during each of the intervals, and subtracting from said sum a product of the percentage of elements changed during each of the intervals.

3. The method of claim 2, wherein said elements are records in a database within the data store.

4. The method of claim 2, wherein said elements are pages in a database within the data store.

5. The method of claim 1, wherein the total number of data elements that changed is estimated by $(((P_0+P_{1'}-P_0*P_{1'})*N_0)+D_1)/N_1$ where $P_0$ is a percent of changed elements at an interval $T_0$, $P_{1'}=C_{1'}/N_1$, where $C_{1'}=C_1-D_1$, $C_1=N_1*P_1$, $N_0$ is a total number of elements at interval $T_0$, $N_1$ is a total number of elements at an interval $T_1$, $P_1$ is a percent of changed elements at interval $T_1$, and $D_1=N_1-N_0$.

6. The method of claim 1, wherein the data store change is estimated by summing a number of changed elements at a first interval, a number of changed elements at a second interval, and a number of elements changed at both the first and second intervals, and dividing the sum by a total number of elements in the data store.

7. The method of claim 1, further comprising determining, based on the estimated total number of data elements that changed, whether to invoke an application program for performing a maintenance operation on the data store.

8. An apparatus for estimating an amount of changed data stored in a data store based on changes made over a plurality of intervals of time, comprising:

a computer having a data store coupled thereto, wherein the data store is configured for storing a plurality of data elements therein; and a program storage unit having stored therein one or more computer programs for execution by the computer, suitable for measuring, for each of the plurality of intervals of time, data elements in the data store that changed in the interval, for estimating data elements in the data store that changed during more than one of the intervals, and for estimating across the plurality of intervals a total number of data elements that change using the measured number of changed data elements and taking into consideration the estimated number of data elements that changed during more than one of the intervals.

9. The apparatus of claim 8, wherein the total number of data elements that changed is estimated by summing a percentage of elements changed during each of the intervals, and subtracting from said sum a product of the percentage of elements changed during each of the intervals.

10. The apparatus of claim 9, wherein said elements are records in a database within the data store.

11. The apparatus of claim 9, wherein said elements are pages in a database within the data store.

12. The apparatus of claim 8, wherein the total number of data elements that changed is estimated by $(((P_0+P_{1'}-P_0*P_{1'})*N_0)+D_1)/N_1$ where $P_0$ is a percent of changed elements at an interval $T_0$, $P_{1'}=C_{1'}/N_1$, where $C_{1'}=C_1-D_1$, $C_1=N_1*P_1$, $N_0$ is a total number of elements at interval $T_0$, $N_1$ is a total number of elements at an interval $T_1$, $P_1$ is a percent of changed elements at interval $T_1$, and $D_1=N_1-N_0$.

13. The apparatus of claim 8, wherein the total number of data elements that changed is estimated by summing a number of changed elements at a first interval, a number of changed elements at a second interval, and a number of elements changed at both the first and second intervals, and dividing the sum by a total number of elements in the data store.

14. The apparatus of claim 8, wherein said one or more computer programs are suitable for determining, based on the estimated total number of data elements that changed, whether to invoke an application program for performing a maintenance operation on the data store.

15. An article of manufacture comprising a program storage medium readable by a computer and embodying one or instructions executable by the computer to perform the method of estimating an amount of changed data stored within a data store based on changes made over a plurality of intervals of time, the data store having a plurality of data elements stored therein, the program storage medium comprising:

program instructions for measuring, for each of the plurality of intervals of time, a number of data elements that change in the interval;

program instructions for estimating a number of data elements that changed during more than one of the intervals; and program instructions for estimating across the plurality of intervals a total number of data elements that changed using the measured number of changed data elements and taking into consideration the estimated number of data elements that changed during more than one of the intervals.

16. The article of manufacture of claim 15, wherein the total number of data elements that changed is estimated by summing a percentage of elements changed during each of the intervals, and subtracting from said sum a product of the percentage of elements changed during each of the intervals.

17. The article of manufacture of claim 16, wherein said elements are records in a database within the data store.

18. The article of manufacture of claim 16, wherein said elements are pages in a database within the data store.

19. The article of manufacture of claim 15, wherein the total number of data elements that changed is estimated by $(((P_0+P_{1'}-P_0*P_{1'})*N_0)+D_1)/N_1$ where $P_0$ is a percent of changed elements at an interval $T_0$, $P_{1'}=C_{1'}/N_1$, where $C_{1'}=C_1-D_1$, $C_1-N_1*P_1$, $N_0$ is a total number of elements at interval $T_0$, $N_1$ is a total number of elements at an interval $T_1$, $P_1$ is a percent of changed elements at interval $T_1$, and $D_1=N_1=N_0$.

20. The article of manufacture of claim 15, wherein the total number of data elements that changed is estimated by summing a number of changed elements at a first interval, a number of changed elements at a second interval, and a number of elements changed at both the first and second intervals, and dividing the sum by a total number of elements in the data store.

21. The article of manufacture of claim 15, further comprising program instructions for determining, based on the estimated total number of data elements that changed, whether to invoke an application program for performing a maintenance operation on the data store.

* * * * *

UNITED STATES PATENT AND TRADEMARK OFFICE
CERTIFICATE OF CORRECTION

PATENT NO. : 6,535,870 B1  Page 1 of 1
DATED : March 18, 2003
INVENTOR(S) : Friske et al.

It is certified that error appears in the above-identified patent and that said Letters Patent is hereby corrected as shown below:

Column 8,
Line 45, that portion of the claim reading: "data elements that change" should read
-- data elements that changed --

Column 10,
Line 14, that portion of the claim reading: "$C_1 -N_1 *P_1$" should read -- $C_1 =N_1 *P_1$ --
Line 17, that portion of the claim reading: "$D_1 =N_1 =N_0$" should read -- $D_1 =N_1 -N_0$ --

Signed and Sealed this

Tenth Day of February, 2004

JON W. DUDAS
*Acting Director of the United States Patent and Trademark Office*

Disclaimer

6,535,870—Craig Alan Friske, San Jose, CA (US); John Marland Garth, Gilroy, CA (US); James Alan Ruddy, Gilroy, CA (US). METHOD OF ESTIMATING AN AMOUNT OF CHANGED DATA OVER PLURALITY OF INTERVALS OF TIME MEASUREMENTS Patent dated Mar. 18, 2003. Disclaimer filed Oct 4, 2006, by the assignee, International Business Machines Corporation.

Hereby enter this disclaimer to all claims, of said patent.

*(Official Gazette, January 9, 2007)*